United States Patent Office 2,982,683
Patented May 2, 1961

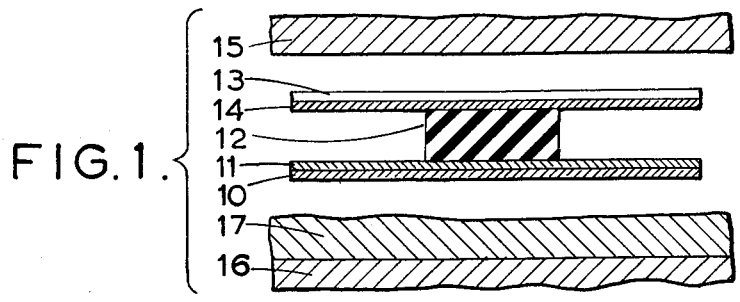
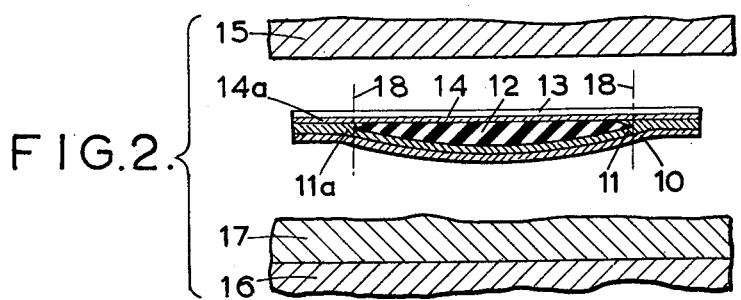
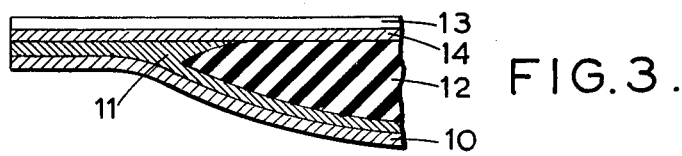
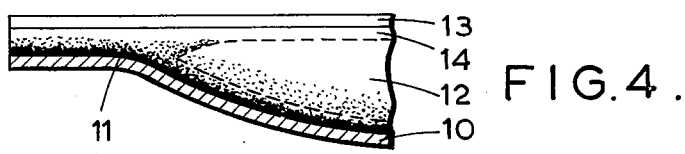

---

2,982,683

METHOD FOR MAKING PATCHES FOR RUBBER ARTICLES

Reginald Donovan Boyce, Denham, England, assignor to Romac Industries Limited, London, England Original application Nov. 17, 1953, Ser. No. 392,703, now Patent No. 2,888,972, dated June 2, 1959. Divided and this application May 31, 1956, Ser. No. 588,346

2 Claims. (Cl. 154—110)

This invention relates to repair patches for rubber or rubberized articles, such as vehicle tyre tubes. It is known for a repair patch to comprise a foundation member of cured rubber, shaped with a bevelled rim or of bulbous conformation, i.e. the thickest part of the member being in the middle, and the thickness decreasing relatively sharply towards the edges, the foundation member having a protective layer on one side and a layer of adhesive on the other side, and the adhesive layer being protected by a layer of paper, metal foil, or other suitable airtight material. A known modification of this kind of patch has the adhesive layer extending beyond the margin of the foundation member, and protected before use by the protective layer extending beyond the foundation member. In such a known construction the projecting rim is unprotected during use except for the backing provided by the protective layer, which is usually of paper, and therefore the rim is easily broken up when the patch has been affixed to a tyre tube and the tyre is undergoing deformation during use. The protective paper cannot be completely removed by hand, but it breaks up into little balls, which cause deterioration or disintegration of the soft rim of adhesive compound. If all the paper could be removed, the unprotected upper surface of the lip would stick to the cover, making tube removal difficult. In addition, poor adhesion occurs between the edge of the cured foundation member and the soft rim of the adhesive layer. It is an object of the present invention to provide a repair patch overcoming these disadvantages, and a method of manufacture of such a patch.

This application is a division of application Serial No. 392,703 filed November 17, 1953, now Patent No. 2,888,972.

According to the invention a method of making a repair patch for a rubber containing article comprises coating a flexible carrier sheet with an extremely thin layer of vulcanizable rubber compound in an uncured state, laying said carrier with its coated side against an uncured vulcanizable rubber disc positioned on an independently unvulcanizable coating of adhesive compound carried on a sheet of protective material, to form a stack, pressing said stack with a hot platen into a resilient cushion carried on a cold platen thereby uniting the vulcanizable coating, disc, and adhesive coating and encasing said disc between the thin layer and adhesive coating while simultaneously shaping the disc and providing an extremely thin lip comprised of the united thin layer and adhesive coating projecting beyond the marginal edges of said disc.

The invention will be described with reference to the accompanying drawings, in which:

Figure 1 is a diagrammatic cross-sectional representation of the layers of a patch at an early stage of manufacture.

Figure 2 is a diagrammatic cross-section of the patch when finished.

Figure 3 is a fragmentary diagrammatic cross-section, greatly enlarged, of the marginal portion of the patch, and Figure 4 is a corresponding view, showing the part vulcanization within the patch in diagrammatic form.

Referring now to the drawings, a sheet of aluminum base foil 10 is first coated with a layer 11 of an adhesive compound of a thickness of approximately ten thousandths of an inch. This thickness, and indeed all the dimensions specified herein, is purely exemplary, and may be modified in a manner that will be well known to those skilled in the art in accordance with the size and characteristics of repair patch required. The aluminum base foil has a thickness of two thousandths of an inch and is inert or "neutral" in that it has no effect on the adhesive compound chemically, but forms a physical protection without inducing any chemical changes during the storage life of the article. The foil is preferably one with a very high degree of surface polish or gloss. This is achieved by heat rolling the foil as a final step in the rolling process by which it is produced, and in addition produces a quasi case-hardening effect on it. It is to be understood that such foil is preferable but is not essential to the invention, and other protective layers may be employed. The adhesive is conveniently rolled on to a foil by a calendering process, and in large scale production the adhesive may be laid continuously on a web of foil.

A suitable mix for the adhesive layer may contain the following ingredients:

Brown crepe thin
M-R-X (mineral rubber)
Z-O-X (zinc oxide)
Asbestine
Carbon black
Stearic acid The proportions may be selected according to requirements, as will be clear to those skilled in the art.

The coated web is cut into sheet form, the size of sheet being governed by the capacity of the plant available for making the patches. The larger the sheet, the greater the number of patches that can be simultaneously manufactured.

The cut sheet is then laid on a supporting surface, foil side downwards and an aluminum template (not shown) is laid on top of it. This template consists of a sheet of aluminum having a thickness sufficient to enable it to be handled conveniently and formed with apertures located in rows at spaced intervals, the spacing depending on the size of patch to be manufactured. For reasons of economy the spacing is as close as possible. In each aperture of the template there is placed a disc of rubber indicated at 12 in Figure 3, ultimately to constitute the central portion of the body of the patch. For a circular patch, the rubber disc 12 is circular and of substantial thickness, i.e. considerably thicker than the ultimate maximum thickness required of the patch. The rubber is in a partially cured, or preferably uncured, state.

A suitable mix for the rubber for the disc may contain the following ingredients:

Pale crepe
Asbestine best
Whitings
Z-O-X (zinc oxide)
Sulphur
Stearic acid
Agerite powder
Turkey red
D.P.G. (di-phenyl-guanidine)

As before, the precise proportions of the mix may be selected according to requirements.

Simultaneously with the above operations a web of paper ultimately to form the protecting and carrier layer 13, and preferably of vellum-type tracing paper, is coated with a curable uncured rubber solution or dough indicated in Figure 1 at 14, the coating being of the order of two thousandths of an inch in thickness. The layer of solution 14, after application to the paper 13, is allowed to dry and is then dusted with a powder such as French chalk.

The mix for the solution may be the same as that for the disc 12, but broken down in a suitable solvent.

After the aluminium template has been removed from the adhesive coated sheet of foil 10, 11, with the discs 12 located thereon, the cover layer 13 is laid over the sheet, with its coated side downwards. The elements of the patch so far described are thus located in the relative positions illustrated diagrammatically in Figure 1. The stack so constituted is placed with the foil side downwards on a blanket or an air or water bag 17 located on a cold platen 16. This platen is itself located under a hot platen 15 and the cold platen 16 is raised against the hot platen 15 and pressure of the order of 200 lbs. per sq. inch is supplied for several minutes (say three or more) at a temperature of the hot platen 15 of the order of 300° F. It will be appreciated that these pressures and temperatures are by way of example only and may be varied within limits well understood by those skilled in the art.

An increase of pressure is then applied for a further period of several minutes, say two to seven minutes. As is well known, the curing time of a compound may be varied according to the ingredients in the mix.

The platens 15, 16 are then separated, the stack is removed and allowed to cool, and is then punched so as to form separate patches. Reference must now be made to Figure 2. During the application of pressure, the disc 12 has considerably decreased in thickness, with a corresponding increase in area, and the upper surface of the stack is subjected to pressure against the rigid hot platen 15, while the lower surface of the stack is shielded from the rigid surface of the lower cold platen 16 by the resilient blanket or bag 17. While this produces a squashing of the disc 12, it results in ultimate rounding of the lower surface of the disc 12, the upper surface ultimately adopting a flat conformation.

The lower surface is not of uniform curvature, since the convexity is more pronounced in the middle, the edges, being thinner and more flexible, adopting a slightly flatter curve. The punching out of the patches from the stack is affected, in the usual manner, but is arranged so that a lip of appreciable dimensions is left all around the thick central portion of the central body 12, outside the broken lines 18 shown in Fig. 2. In other words, the diameter of the finished patch after punching is arranged to be substantially greater than the final diameter of the disc 12.

If it is desired to print any legends on the finished patch, these may be conveniently printed in reverse and in correct register on the under surface of the protective paper layer 13 before the coating of the solution or dough 14 is applied thereto. Such a course can, it is to be understood, only be adopted when the transparency of the carrier layer 13 is such as to enable the legend to be read. If an opaque material is chosen for the carrier layer 13, then the printing must be done at some other stage of manufacture, but the method described enables the legend itself to be protected against subsequent handling since it is beneath the surface of the protective paper layer 13.

Alternatively, the printing may be carried out in reverse on the protective layer 13, whether opaque or not, using a printing ink that will transfer itself to the patch. This enables a permanent legend to be applied to the actual surface of the patch.

Figures 3 and 4 show the finished patch in greater detail. In Figure 3, it will be seen that the layer of foil 10 is curved while the paper carrier layer 13 and solution layer 14 have conformed with the first shape assumed by the top surface of the main body 12. The layer of adhesive 11 has, however, crept between the margin of the disc 12 and the solution layer 14. The exact behaviour of the adhesive is not understood, but it appears to assume the form of a wave which moves radially inwards, relatively to the disc, and to have a breaking crest which laps around the margin of the disc body.

The effect of this is extremely important, and contributes largely to the efficiency of the patch, particularly in association with the stages of vulcanization which the particles of rubber achieve at various strata within the thickness of the patch. An attempt is made in Figure 4 to depict such stages of vulcanization. The various rubber layers 11, 12, and 14 are shown as one area (the disc 12 being demarcated by broken lines) variously shaded to indicate vulcanization. The lighter areas are more completely vulcanized than the darker areas, and, while complete vulcanization has taken place in the layer 14, and in almost all the disc 12, and the vulcanizing effect can be seen to have crept downwards (i.e. from the hot platen 15), the layer of adhesive 11 is virtually completely unvulcanized at its lower surface. This unvulcanized area extends only to a small degree into the wave of adhesive that laps around the margin of the disc 12, and the wave tends to bond the disc 12, and the lip 14a together to effect greater strength.

The upper surface of the adhesive is vulcanized to a small and graduated extent by permeation of the vulcanizing effect of the vulcanizable main body, ensuring a permanent bond between the disc and adhesive layer.

Not only are the drawings purely diagrammatic, as regards the relative dimensions of the various layers, but the degree of vulcanization in the various strata is dependent on the rubber mixes employed, and the heat and pressure imparted by the platens. Such factors will be well understood by those skilled in the art, and will be chosen according to the dimensions and characteristics required in the finished patch.

A patch made in this way has a cured body with a thick central portion and a rim (indicated at 14a in Figure 2) of extreme thinness and lying co-extensive with the rim 11a of adhesive compound. It is to be noted that this extreme thinness, obtained by the use of the initially coated sheet 13, 14 is much less than could be obtained by ordinary moulding of the cured foundation member.

In use the patch is applied in the ordinary way, that is to say, the protective foil 10 is stripped away and the adhesive layer 11 applied to the article to be repaired. It will be seen that the rim 11a of the adhesive layer 11 is backed by an extremely thin layer 14a of cured rubber, in turn covered (before use) by its own protective layer 13 of paper or linen, and this backing of the adhesive layer 11 with a thin layer 14 of cured rubber around the rim effectively overcomes the deterioration of the adhesive layer hitherto encountered. The protective layer 13 of paper or linen can be removed from the patched tube before it is inserted in the cover, and the rubbing effect of the tyre cover is thereby resisted, thus rendering impossible the break of the protective layer into little balls as has been mentioned above. During the running of the tyre and due to the heat generated, the skin 14a of cured rubber lying over the adhesive rim 11a, combined with the pressure of the inflated tube, will eventually partially cure the uncured rim 11a, so effecting a completely permanent repair.

A patch according to the invention can be applied and vulcanized in a vulcanizing press if desired in two minutes, thus resulting in a great saving of time over known patches. Due to the presence of the cured rim, the margin of the patch can be pressed out to effect a superior union with the tube. The fact also that the exposed surface of the patch is cured protects the repair against the effect of oxidation and provides a good ageing life for the patch. The cured rim is not resilient, since it is faced by the adhesive layer. Thus, if the cured rim is deformed, it is held in its deformed position by the adhesive layer. This results in the cured rim accommodating itself to movements of the main body of the patch, or of the article to be repaired, in a non-resilient, passive, manner, and prevents any initial deterioration of the union between the cured rim and the article to be repaired.

Moreover, porosity and air pockets in the various layers is obviated during manufacture, and the use of glossy foil as a protective layer for the adhesive surface imparts maximum sensitivity to the adhesive surface when the foil is removed to enable the patch to be applied, and prevents the trapping of air between the adhesive surface and the article to be repaired.

I claim:

1. A method of making a repair patch for a rubber inner tube which comprises, coating a flexible carrier sheet with an extremely thin layer of vulcanizable rubber compound in an uncured state, laying said carrier with its coated side against an uncured vulcanizable rubber disc to form a stack in which the disc is engaged against a layer of rubber adhesive coated on a sheet of protective material with the rubber disc sandwiched between the layers, said layers being provided to protrude beyond the marginal edges of the disc on all sides thereof with the protruding portions of the layers in face to face contact along the entire facing areas thereof, pressing said stack with a hot platen juxtaposed the carrier sheet into a resilient cushion carried on a cold platen with the cushion juxtaposed the protective sheet in a predetermined vulcanization procedure in which the disc is deformed to provide a thick central body portion and an integral peripheral rim of extreme thinness projecting beyond the body portion, said procedure affecting complete vulcanization of the disc and permanent union of the rubber compound layer and adhesive layer to form the rim by curing of the entire rubber compound layer and only the portions of adhesive layer adjacent the rubber compound layer and the disc and without curing those portions of the adhesive layer immediately adjacent the protective sheet.

2. The method described in claim 1 in which the vulcanization is preceded by placing of a plurality of rubber discs spaced apart on the adhesive layer and followed by severing of the individual patches from the stack.

References Cited in the file of this patent

UNITED STATES PATENTS

| | | |
|---|---|---|
| 1,129,933 | Wiedemann | Mar. 2, 1915 |
| 1,348,466 | Wood | Aug. 3, 1920 |
| 1,480,976 | Wight | Jan. 15, 1924 |
| 1,652,726 | Mook | Dec. 13, 1927 |
| 2,292,286 | Owen | Aug. 4, 1942 |
| 2,486,669 | Nassimbene | Nov. 1, 1949 |
| 2,491,525 | Sparks et al. | Dec. 20, 1949 |
| 2,638,955 | Gruber | May 19, 1953 |
| 2,653,885 | Harper | Sept. 29, 1953 |
| 2,680,700 | Meyers | June 8, 1954 |
| 2,681,877 | Seymour | June 22, 1954 |
| 2,706,699 | Plansoen et al. | Apr. 19, 1955 |
| 2,803,283 | Gruber | Aug. 20, 1957 |
| 2,855,014 | Gruber | Oct. 7, 1958 |

FOREIGN PATENTS

| | | |
|---|---|---|
| 26,706 | Great Britain | of 1910 |